Nov. 6, 1934.                G. LOEFFLER                1,979,892
                         SPRING SUSPENSION SEAT
                    Filed March 29, 1934        2 Sheets-Sheet 1
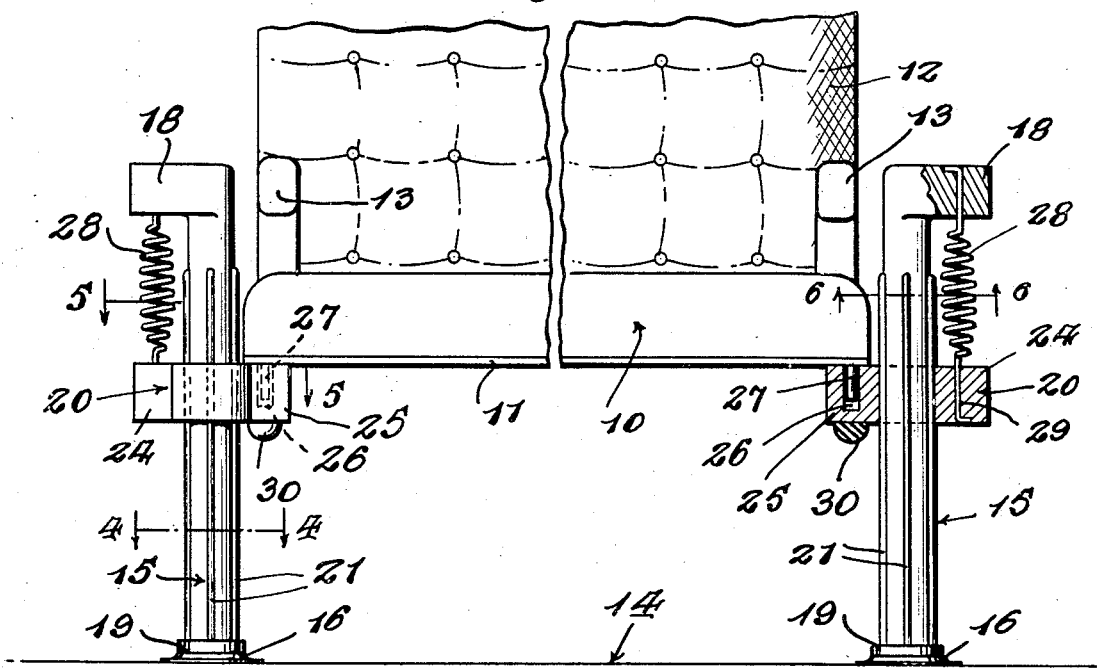
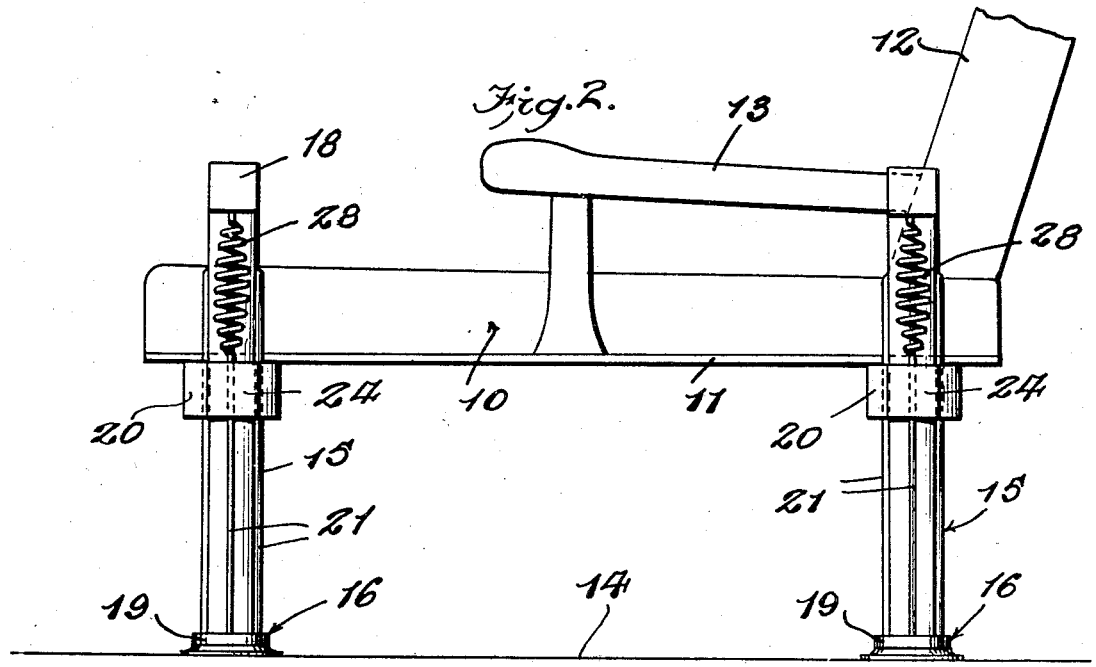
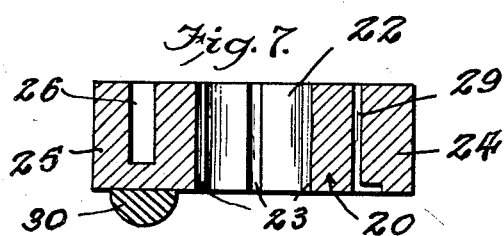
Inventor
George Loeffler,
By Christian L. Nieken,
Attorney

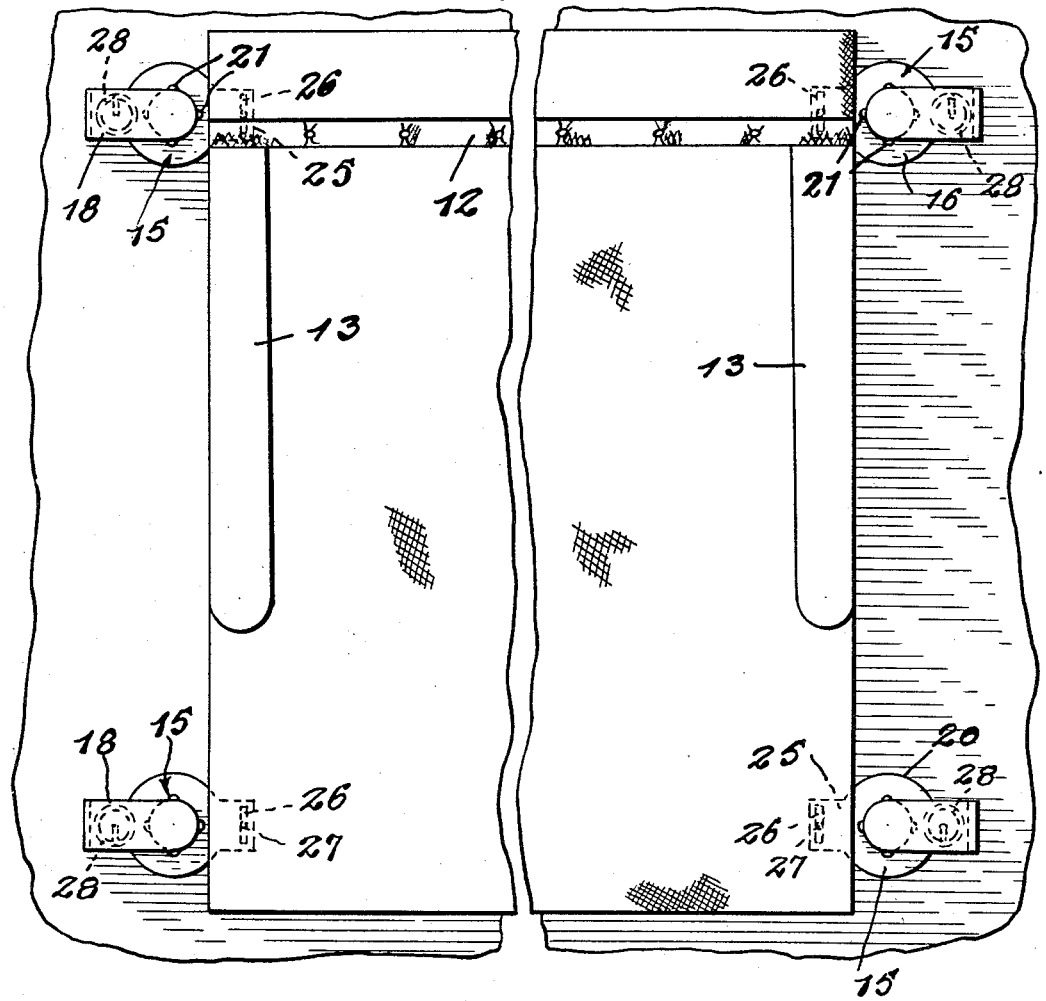

Patented Nov. 6, 1934

1,979,892

UNITED STATES PATENT OFFICE 1,979,892

SPRING SUSPENSION SEAT

George Loeffler, New York, N. Y.

Application March 29, 1934, Serial No. 718,078

4 Claims. (Cl. 155—50)

This invention relates to spring suspension means for seats and the like and it consists in the constructions, arrangements and combinations herein described and claimed.

It is an object of the invention to provide new and novel means for the resilient support of seats whereby shocks and jars may be effectively eliminated, making the device especially desirable for use in motor cars, railroad cars, aeroplanes, boats, and similar conveyances.

It is also an object of the invention to provide a supporting structure wherein a seat associated therewith will have free vertical movements, yet free of objectionable lateral movements or oscillations.

It is a still further object of the invention to provide a seat suspension means in which the seat proper may be quickly attached or detached therefrom.

Additional objects, advantages, and features of invention will be apparent from the following description and accompanying drawings, wherein Figure 1 is a front elevation of a seat constructed in accordance with my invention, partly in section.

Figure 2 is an end view thereof.

Figure 3 is a fragmentary top plan view.

Figure 4 is a cross section of one of the davits on the line 4—4 of Figure 1.

Figure 5 is a cross section on the line 5—5 of Figure 1.

Figure 6 is a cross section on the line 6—6 of Figure 1.

Figure 7 is a vertical section through one of the guide-suspension blocks.

Figure 8 is a cross section of a modification of the davit.

There is illustrated a seat 10 which may be constructed in the customary manner having a base 11 and integrally connected back portion 12, and may also comprise arm rests 13, if desired. The seat described is adapted for suspension from davits or supports as will now be described, it being assumed that the seat is incorporated in a motor vehicle body.

The floor of the motor vehicle is represented at 14 and upon the flooring there are secured davits 15, in the present instance, four being shown. The davits 15 are positioned adjacent respective corners of the seat, as clearly seen in Figure 3. In the preferred construction of the davit, they are formed of round metal stock, of desired length, one end of which is provided with a detachable foot 16 suitably apertured for reception of fastening means, such as screws or bolts 17.

The opposite end of the davit terminates in an arm 18 extended at right angles thereto, and functions as an attaching means for the seat, as will be explained.

The foot members 16 may be in the form of annular plates having an upstanding collar 19 internally screw threaded for engagement with complemental threads formed upon the lower ends of the davits 15. This construction permits positioning of guide blocks 20 on respective davits.

Longitudinally extending ribs 21 are formed on the periphery of the davits, extending from a point closely adjacent the foot 16 and stopping short of the arm 18, these ribs serving to guide the blocks 20 in their sliding movements upon the davits, as will presently appear.

Attention is now invited to Figure 7 of the drawings, particularly, wherein one of the guide blocks 20 is illustrated in cross section. It will be noted that the block 20 has a central aperture 22 therethrough of a size to snugly yet slidably receive a davit, the inner periphery of the aperture being formed with longitudinally extended grooves 23, suitably spaced so as to accommodate a rib 21 therein.

The blocks 20 also comprise oppositely extended arms 24 and 25, and when the blocks 20 are positioned upon their respective davits, the arm 24 is disposed immediately beneath the arm 18 of a respective davit with the arm 25 extended inwardly toward the seat 10. Each of the arms 25 are slotted as at 26, and receives therein a lug 27 fixed to the bottom 11 of the seat, adjacent respective corners thereof.

A helical spring 28 is secured at one end to each of the arms 18 of the davits, the opposite end of each spring being secured in apertures 29 of respective arms 24 of the guide blocks.

From the foregoing it will be seen that the blocks 20 are suspended from the arms 18 by means of the springs 28, guided by the davits 15, the ribs 21 serving to insure an even sliding movement of the blocks without liability of any binding action between the blocks and davits, such as might occur if weight upon the seat is not evenly distributed.

In case of severe jolts or jars which often occur in vehicles travelling upon rough roads, the seat may possibly engage the floor 14 or luggage therebeneath, and in order to lessen the shock thereof, cushion blocks 30 are mounted upon the undersides of the arms 25. Thus, the shock encountered by engagement with the floor will be absorbed by the blocks 30. The springs 28 will, of course, be of such strength as to prevent contact of the seat with the floor, under normal conditions.

By the construction presented, it will be seen that considerable storage space is provided beneath the seat proper; and that the seat may be entirely removed from the supporting davits by merely lifting the seat, so as to disengage the lugs 27 from the slots 26. The seat may also be readily replaced, as will be apparent.

Obviously, the davits 15 may embody longitudinal grooves 31 and the blocks 20 would then be provided with ribs 32 complemental thereto, as shown in Figure 8, this being a reversal of the structure previously described.

While I have shown and described a preferred construction of my seat, it will be understood that modifications thereof may be made, and I therefore reserve as my own, all such structures as fairly fall within the scope of the appended claims.

I claim:—

1. In a resiliently supported seat, a plurality of upright support members, vertically extended ribs on said support members, a seat supporting block member slidable on each support member, each block having a plurality of grooves complemental to said ribs, a seat detachably supported by each block, and respective spring means for supporting the blocks.

2. In a resiliently supported seat, a plurality of davits, each davit having a supporting arm at their upper ends, vertically extended ribs on said davits, a seat supporting block member slidable on each davit, each block having a plurality of grooves complemental to said ribs, a slot formed in each block; a seat, said seat having lugs for disposition in respective slots for detachably supporting the seat, buffer means fixed to the underside of each block, and spring means connected between respective arms of the davits and blocks.

3. In a resiliently supported seat, upright support members, vertically extended ribs on said support members, means vertically slidable on the support members having means complemental to the ribs and engaging the same, springs on said upright members supporting the slidable means, and a horizontal seat member supported by said slidable means.

4. In a resiliently supported seat, a plurality of upright support members, each support member having vertically extended grooves, a seat supporting block member slidable on each support member, each block having means complemental to the grooves and engaging the same, a horizontal seat member detachably supported by said blocks, and spring means on said upright members supporting the blocks.

GEORGE LOEFFLER.